G. J. KINGSBURY.
Coal Stove.
No. 3,897. Reissued March 29, 1870.
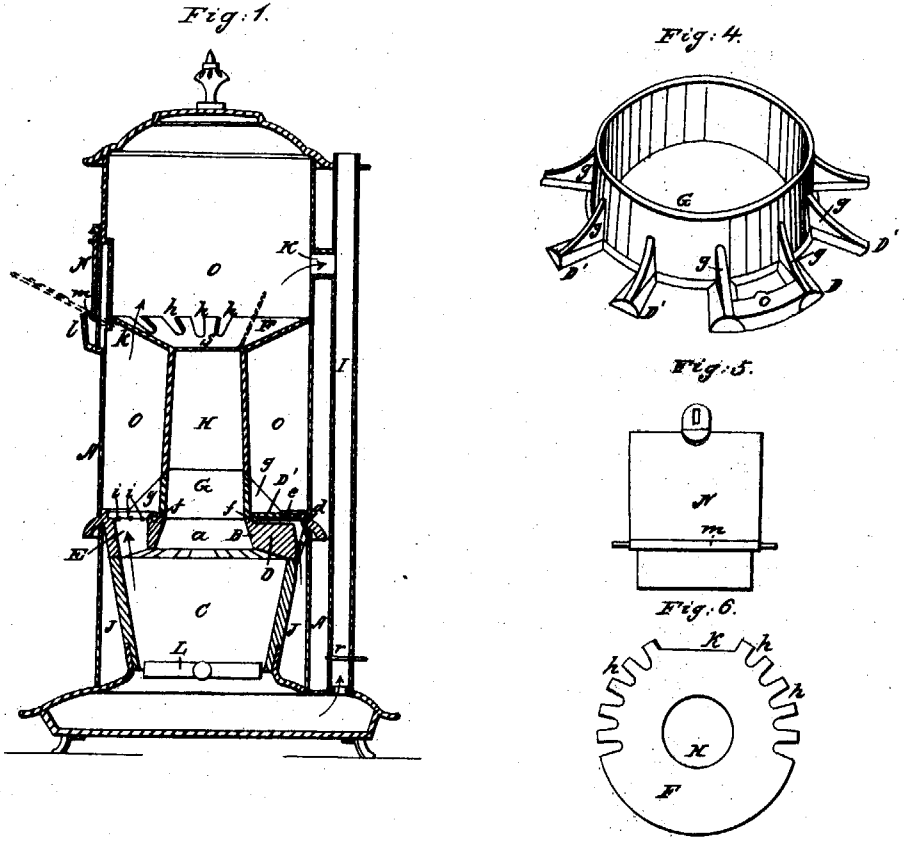
Witnesses:
H. G. Giles.
J. Fraser.
Inventor:
Gilbert J. Kingsbury.
N. PETERS, Photo-Lithographer, Washington, D. C.

United States Patent Office.

HENRY G. GILES, OF TROY, NEW YORK, ASSIGNEE, BY MESNE ASSIGNMENTS, OF GILBERT J. KINGSBURY.

*Letters Patent No.* 23,587, *dated April* 12, 1859; *reissue No.* 1,409, *dated February* 17, 1863; *reissue No.* 3,897, *dated March* 29, 1870.

COAL-STOVE.

The Schedule referred to in these Letters Patent and making part of the same

*To all whom it may concern:*

Be it known that GILBERT J. KINGSBURY, of Rochester, New York, heretofore invented certain new and useful Improvements in Coal-Stoves, and I, HENRY G. GILES, of Troy, New York, the assignee of said KINGSBURY, do hereby declare that the following is a full, clear, and exact description of said invention, and of the mode of operation of the same, reference being had to the accompanying drawings making a part of this specification, in which—

Figure 1 is a central vertical section of the improved stove.

Figure 2 is a plan of the upper portion B of the fire-pot.

Figure 3 is a vertical section of the same.

Figure 4 is a perspective view of the cap G

Figure 5 is a front view of the feed-door.

Figure 6, a plan of the funnel-head or concave rim of the supply-chamber.

The base of the stove contains the ash-pit, and on its front side is a register or damper for regulating the ingress of air to the fire. The outside casing or stove-body A may be of any convenient form and of any suitable material, but the lower part from the base to the top of the fire-pot is preferably of open or fret-work, that it may permit of direct radiation of the heat from the fire-pot.

The fire-pot is preferably of two parts B and C, the whole forming in shape the inverted frustum of a hollow cone.

The lower part C is properly the fire-pot or part containing the burning coals. It is made flaring or expanding upward, being larger at the top than at the bottom, and of such slope as to radiate the heat from its sides downward and beyond the base.

It has the grate L at the bottom. The sides may be plain or corrugated.

B is the top of the fire-pot, a plan of which is seen in fig. 2, and a vertical sectional view in fig. 3.

It is composed of two concentric rings connected by one or more radial arms D, leaving a space or spaces E E between such rings and arm or arms for the ascent of the flame, heat, and other products of combustion, while the central circular space *a*, formed by the inner ring, serves for the descent of the coal from the supply-chamber to the fire-pot.

In the upper face of said inner ring which forms said central opening *a* is a groove, *f*, running all around it, and extending from *f* is a longitudinal groove, *e*, in the upper surface of each radial bar or arm D, each groove *e* connecting at the outer end with a passage or orifice, *d*, which extends down through the edge of the outer ring of B and opening into the space J outside of the fire-pot and ash-pit.

The said bar or bars D have notches *i i i* in their upper surface extending laterally on each side from the groove *e* to the edges, and opening into the space or spaces E E, and on the upper surface of the inner ring of B are similar notches *i i i* extending from the groove *f* to the outer edge of said ring and opening like the first into said spaces E E.

On the top of B rests a short cylindrical cap, G, which has the like radial arms or bars D′ as those on B, which cylinder G and arms D′ when in place closely fit and cover the arms D and the inner ring of B respectively, as seen in figs. 1 and 3.

The lower end of G and the bar or bars D′ may have on their under surfaces grooves corresponding with *f* and *e* respectively, and notches similar to *i i i*, but the grooves in D′ should not reach quite to the outer ends of such bars, as otherwise they would allow an escape of the air conveyed therein.

These radial bars D′ may be stiffened and braced by vertical ribs or flanges *g g* occupying the angles between said bars and the sides of the cylinder G, as represented in figs. 1 and 4.

The purpose of the grooves *e* and *f*, and the notches *i i i*, arranged substantially as described, is to bring in and heat exterior air, and pass it out into the space or spaces E E above and over the ignited coal where it may mix with the gases arising from such burning coal and inflame the same, and also to cool the parts through which the air passes, and prevent them from burning. The cap G also serves as the base of the supply-cylinder H.

The supply-cylinder H is surrounded by the gas-combustion chamber, O; said cylinder may enlarge slightly in diameter downward to allow the coal to descend the more readily; its lower end rests on G and the upper end is closed with a tight-fitting cover *s*, and surrounding its upper end is a concave flange or funnel-shaped rim, F.

The said rim F should be broad enough to close the space between the supply-cylinder H and the outer casing A, but having a small segment, *k*, cut off from its front side, and having several notches *h h h* on each side thereof, as seen in figs. 1 and 6, leaving the back portion entire, by means of which form and arrangement the direct upward tendency of the heat is checked and retained in the lower part of the stove and finally brought to the front of the stove before it passes into the heating-chamber O formed by the concave rim F, cover *s*, the top of the stove, and the outer casing A. At the front of the stove in the casing A is the door N; it turns on a horizontal axis or bearings, *m*, placed about one-third the height of the door from the bottom thereof, as seen in figs. 1 and 5.

The door, when open, rests its lower end against the edge *k* of F, as seen in fig. 1, and the door and flange when so arranged form a continuous chute or slide for conveying coal into the fire-pot and supply-cylinder.

A pipe, I, extends from the bottom upward in the rear, and having the smoke-pipe K connected with it, as seen in fig. 1, with a damper, *r*, for closing the passage or regulating the draught through it, it forms a back flue and serves many useful purposes, it may also have a register in it, which will serve as a check to the draught by letting in exterior air, as well as to ventilate the room.

The operation of the improved stove is as follows:

After the fire is kindled upon the grate L the door N is opened so that its lower end rests against the edge *k* of F, as indicated by the red lines in fig. 1, and the cover *s* of the supply-cylinder is then raised, when the fire-pot and supply-cylinder may be filled with coal by passing the same down the chute formed by the door N and rim F, the cover *s* is then turned down and the door N closed.

The damper *r* in the pipe I should be closed, and the register in front of the ash-pit opened, when the coal in the fire-pot will ignite.

The only upward draught through the fire-pot to the chimney being through the spaces E E, the fire will burn principally at the sides of the pot, where will always be found the greatest heat, which will be radiated through such sides and downward toward the floor and beyond the base, where it is most needed, by reason of the flaring form of the fire-pot, the disengaged heat not so radiated, and other products of combustion will rise through said spaces E E, which will have a tendency to impinge them against the outer casing, through which most of such heat will be radiated before it escapes to the chimney. At the same time exterior air is drawn through the grooves *e* and *f*, and being heated in its passage therein issues from the notches *i i i* laterally into the spaces E E at the point above and over the fire, when the gases arising from the ignited coal are the hottest, and, mixing with them, the whole is at once ignited and thrown into a bright flame, which will continue as long as the fire burns, and thus all the gases are utilized and a cheerful appearance is given to the stove by the aid of mica windows in the casing A. The passage of the air through the grooves *e* and *f* also serves to cool, in a measure, the parts and prevent them from burning out, as the coal burns below, the fire is constantly replenished by the descent of the coal in the supply-cylinner, and the supply-cylinder may be refilled at any time without affecting the fire. When it is desirable to check the fire to a greater degree than the closing of the front damper will do, the damper *r* in the pipe I may be opened, thus opening a draught from below the fire up the pipe I, which will tend to diminish combustion, and will also have a tendency to draw down the heat toward the base of the stove, and prevent the fire extending up into the supply-cylinder, or instead of opening *r* the register may be opened, which will check the draught in the smoke-pipe, as well as ventilate the room; by opening the damper *r* before the grate is shaken or the ashes are removed, the draught will carry off the dust without suffering it to spread in the room.

What I claim as the invention of said GILBERT J. KINGSBURY, and desire to secure by Letters Patent, is—

1. The introduction of air into the stove above the burning coal so that the same may intermix with the gases arising from the burning coal and aid in igniting the same, in combination with the feeding-cylinder H, substantially as described.

2. A "descending draught" for supplying air to the combustion-chamber is not claimed, but there is claimed the annular groove *f* at the base of the supply-cylinder connected with an outer passage or passages for the admission of air to the point *f*, arranged and operating substantially as described.

3. The combination of the said annular groove *f* with the radial grooves *e e e* connecting with the outside air passages *d d* and having the lateral notches *i i i* therein, substantially as described.

4. The cap G, or its equivalent, forming a connection between the fire-pot and the feed-cylinder, where it conforms to the upper end of the fire-pot and external air is admitted underneath for the combustion of the gases, as described.

5. The door N, constructed and arranged substantially as described, to serve as a door when closed, and as a chute or slide for the coal to the feed-cylinder when open, in combination with the said supply-cylinder.

6. The door N, located as described, in combination with the flange F and reservoir H.

7. The flue or pipe I, connected with the base as well as the top (by flue K) of the stove, substantially as described, in combination with the supply-cylinder H and fire-pot C.

8. In combination with the elements of the foregoing claim, the damper *r*.

9. The flange F in combination with the supply-cylinder H.

10. The combination of the rim F, cover *s*, or their equivalents, and the casing A, and the top of the stove, forming the heating-chamber O, substantially as described.

HENRY G. GILES.

Witnesses:
LEONARD H. GILES,
J. M. HOWK.